United States Patent
Shimauchi et al.

(10) Patent No.: US 7,227,089 B2
(45) Date of Patent: Jun. 5, 2007

(54) ELECTRIC BALANCE WITH SYNTHETIC PID CONTROL SIGNAL

(75) Inventors: Kunio Shimauchi, Kyoto (JP); Hiroshi Hamamoto, Kyoto (JP); Kimitoshi Tamura, Kyotanabe (JP)

(73) Assignee: Shimadzu Corporation, Kyoto-shi (JP)

( * ) Notice: Subject to any disclaimer, the term of this patent is extended or adjusted under 35 U.S.C. 154(b) by 233 days.

(21) Appl. No.: 11/034,610

(22) Filed: Jan. 13, 2005

(65) Prior Publication Data

US 2005/0159918 A1    Jul. 21, 2005

(30) Foreign Application Priority Data

Jan. 19, 2004    (JP)    ............... 2004-010533

(51) Int. Cl.
*G01G 7/04*    (2006.01)
(52) U.S. Cl. ............... 177/210 EM; 177/212; 702/101
(58) Field of Classification Search ........ 177/210 EM, 177/212; 702/101
See application file for complete search history.

(56) References Cited

U.S. PATENT DOCUMENTS 5,115,877 A *    5/1992    Komoto .............. 177/212
6,774,319 B2 *   8/2004    Aoki et al. .......... 177/144

FOREIGN PATENT DOCUMENTS

| CN | 1098196  | 2/1995 |
| JP | 3-170818 | 7/1991 |
| JP | 9-005147 | 1/1997 |
| JP | 10-019642| 1/1998 |

* cited by examiner

*Primary Examiner*—Randy W. Gibson
(74) *Attorney, Agent, or Firm*—Rankin, Hill, Porter & Clark LLP

(57) ABSTRACT

In electronic balance, an analog computation portion determines at least a differential control signal according to an amount of displacement of a beam. A digital computation portion determines at least an integral control signal is determined by after the amount of displacement of the beam is digital-converted. The control signal component determined by the digital computation portion is analog-converted. Thereafter, a synthetic PID control signal is determined by being synthesized from a resultant signal and the control signal component, which is determined by the analog computation portion. Subsequently, a coil current based on the synthetic PID control signal is passed through the coil. A weight value is obtained according to the control signal component determined by the digital computation portion.

1 Claim, 3 Drawing Sheets

ELECTRIC BALANCE WITH SYNTHETIC PID CONTROL SIGNAL

BACKGROUND OF THE INVENTION

1. Field of the Invention

The present invention relates to an electronic balance of the electromagnetic force balancing type and, more particularly, to the control of a beam of an electronic balance and to the measurement of a weight value.

2. Description of the Related Art

In an electronic balance of the electromagnetic force balancing type, a coil is attached to a moving part of a beam that is displaced according to a weight to be measured. This coil is placed in a magnetic field generated by a permanent magnet. An electromagnetic force, which is generated by passing electric current through the coil, and the weight to be measured are balanced. Thus, the magnitude of the weight to be measured is determined according to the coil current, which is obtained when the weight to be measured and the electromagnetic force are balanced, or to a control signal used for determining such a coil current.

The coil current is determined according to the amount of displacement of the beam, which is detected by a displacement detector for detecting the displacement of the moving part of the beam, and feedback-controlled so that the moving part of the beam is displaced in such a way as to maintain a balanced point (or zero point).

Usually, PID (Proportional, Integral, and Differential) control is performed as the feedback control applied to the coil current. According to the PID control of the electronic balance, the value of a controlled variable is determined by the following equation and outputted as an amount of the coil current.

[Equation 1]

$$Y = P \times X + I \times \int X dt + D \times dX/dt \quad (1)$$

where "Y" designates an amount of the coil current, "X" denotes an amount of displacement of the beam, "P" designates a proportional constant, "I" denotes an integral constant, and "D" designates a differential constant.

That is, a synthetic PID control signal is synthesized from (or by adding up) a component being proportional to the amount X of displacement of the beam, an integral component of the amount X thereof, and a differential component of the amount X thereof, and outputted as the amount Y of the coil current.

Conventional PID control of an electronic balance employs an analog method of determining a P control signal, an I control signal and a D control signal as signals, which represent analog amounts, by performing analog computations according to the amount of displacement of the beam, which is detected by the displacement detector as an analog amount and by then generating a coil current according to the control signals. However, as a digital control technique advances, there has become widespread an electronic balance employing a digital PID control method of determining a P control signal, an I control signal and a D control signal as signals, which represent digital amounts, by A/D-converting (or digital-converting) the amount of displacement of the beam, which is detected by the displacement detector as an analog amount, and by then performing digital computations on the P control signal, the I control signal, and the D control signal and of subsequently D/A-converting (or analog-converting) the P control signal, the I control signal, and the D control signal, which represent digital amounts, to thereby produce a coil current (see, for instance,) JP-A-10-19642).

The digital method has an advantage in that a user can easily change the set values of the proportional constant (P), the integral constant (I) and the differential constant (D) in the equation (1) in a case where the set values of the proportional constant (P), the integral constant (I) and the differential constant (D) are changed according to a user environment (for example, in a case where the constants are changed in the user environment, in which microvibrations frequently occur, so as to suppress the influence of the microvibrations. That is, alteration of the set values of the constant in the analog method requires the adjustment of a semi-fixed resistor or the like included in the analog computation circuit and compels the user himself to perform a difficult operation of adjusting the semi-fixed resistor or the like. In contrast, although the digital method needs an input device, such as a key switch, for inputting a set value into the digital computation circuit, the user has only to input an appropriate constant value thereto by using the input device. Thus, the user can easily change the set values of the constants.

However, the analog PID control method and the digital PID control method have advantages and drawbacks other than those described hereinabove.

The analog PID control method has advantages in that a processing time for the A/D conversion, the computation and the D/A conversion is unnecessary, and that a control operation can be performed without time delay in responding to displacement of the beam.

Meanwhile, the analog method needs to digitize the analog amount when the weight value is indicated as a digital value (even in the case of employing the analog feedback control, it is general to indicate a weight value as a digital value). At that time, an error (a quantization error) due to the A/D conversion is caused between a weight value (an analog amount), which corresponds to the feedback coil current, and a weight value (a digital value) indicated in an indicator as a result of measurement. That is, the coil current needed for the feedback control is determined according to the analog amount of which an A/D conversion is not performed, whereas the weight value indicated in the indicator is determined according to the digital value obtained after the A/D conversion. Thus, the quantization error is caused therebetween.

Meanwhile, the digital PID control method determines both the coil current value and the weight value according to the same digital amount obtained after the A/D conversion (because an amount obtained by D/A-converting the same digital value as that used for determining the indicated weight value is used as the analog amount used for determining the coil current (an analog amount), no quantization error is caused between the weight value corresponding to the coil current and the indicated weight value). Thus, the digital method has an advantage in that no error due to digitization is caused. However, according to the digital method, a control operation performed in response to displacement of the beam is delayed, as compared with that performed according to the analog method. Thus, control stability is degraded.

Thus, the analog control method and the digital control method have contradictory characteristics relating to feedback control stability and measurement accuracy. Further, the digital control method features that the set values of the PID constants can easily be changed by annexing an input apparatus to the electronic balance. Consequently, the recent electronic balance employs one of the analog control method and the digital control method according to the purpose of use.

Not only the capability to achieve an accurate measurement with a small measurement error (including quantization error) but the capability to enable a stable measurement with excellent measurement responsivity are simultaneously required of the electronic balance.

As compared with the aforementioned two methods, the analog control method is superior in responsivity associated with the displacement and excels in stability. However, the analog method is inferior in measurement resolution and measurement accuracy. Conversely, the digital control method is superior in the measurement resolution and the measurement accuracy and inferior in the stability. Thus, according to the conventional analog control method and to the conventional digital control method, it is difficult to provide an electronic balance enabled to perform measurement with high resolution and accuracy and with high stability.

SUMMARY OF THE INVENTION

Accordingly, an object of the invention is to realize an electronic balance with high resolution and accuracy and with high stability by devising a more sophisticated PID control method.

Further, an amount of displacement of the means varies with the value of the weight of a load. Accordingly, another object of the invention is to provide an electronic balance enabled to quickly cause the beam to reach a balanced point (a zero point) by damping the movement of the beam depending upon a situation, regardless of the amount of displacement of the beam, and also enabled to achieve fast-indication of a weight value as accurately as possible, even in a transient state until the position of the beam becomes stable.

To solve the problems, according to the invention, there is provided an electronic balance used by balancing an electromagnetic force and a weight comprising:

a beam capable for being displaced according to the weight;

a coil attached to the beam and placed in a magnetic field;

a displacement detector for detecting an amount of displacement of the beam;

an analog computation portion for determining at least a differential (D) control signal according to the amount of displacement of the beam;

a digital computation portion for determining at least an integral (I) control signal after the amount of displacement of the beam is digital-converted; and a synthesizing portion for synthesizing from a resultant signal obtained by analog-converting the control signal component which is determined by the digital computation portion and the control signal component, which is determined by the analog computation portion in order to determine a synthetic PID control signal, wherein a coil current based on the synthetic PID control signal is passed through the coil to generate the electromagnetic force, and a weight value is obtained according to the control signal component determined by the digital computation portion.

According to the electronic balance of the invention, the proportional (P) control signal, the differential (D) control signal, and the integral (I) control signal are determined according to the amount of displacement of the beam, which is detected by the displacement detector. The coil current is passed through the coil according to a synthetic PID control signal synthesized from the proportional (P) control signal, the differential (D) control signal, and the integral (I) control signal. At that time, at least the differential (D) control signal is determined by the analog computation portion. Then, an analog feedback control operation is performed on a coil current corresponding to the differential (D) control signal component. The differential (D) control signal component is a control signal outputted in response to a rapid movement of the beam and is used for enabling a quick response thereto in a transient state in which the beam moves. However, in a state in which the beam has reached a balanced condition and is stable (that is, in a state in which an accurate measurement of a weight can be achieved), the magnitude of the differential (D) control signal component is 0. Thus, the differential (D) control signal component does not contribute to the coil current. Consequently, when the weight value is obtained, the differential (D) control signal component does not affect the weight value.

Thus, the differential (D) control signal is not incorporated into the calculation of the weight value, so that the digitization thereof is not performed.

Therefore, a quick response in a transition period can be ensured by performing the analog feedback control on the differential (D) control signal component. Additionally, the digitization for measuring the weight value is not performed on the differential (D) control signal. Thus, no quantization error due to the digitization affects the measurement accuracy.

Further, at least the integral (I) control signal is determined by the digital computation portion by digital-converting the amount of displacement of the beam and using the digitized amount of displacement of the beam. Thus, a digital feedback control operation is performed thereon. The integral (I) control signal component is a control signal that is outputted for performing a control operation so as to maintain the beam in a balanced condition in a state (a zero-point state) in which the beam has reached the balanced point and is stable (in the balanced condition, the magnitudes of the proportional (P) control signal component and the differential (D) control signal component are 0), and that affects the calculation of the weight value.

Therefore, a feedback control operation is performed on the integral (I) control signal component according to the digital signal after obtained by the A/D conversion. Moreover, the weight value obtained according to this digital signal is indicated. Thus, quantization errors between the weight value, corresponding to the coil current and the indicated weight value, which are caused due to the digitization, are suppressed. Consequently, a high-accuracy weight value can be obtained.

Then, the digital control signal components (including at least the integral (I) control signal component) determined by the digital computation portion are analog-converted. After the D/A conversion, a synthetic PID control signal is determined by being synthesized from a resultant signal of the D/A conversion and the analog control signal component (including the differential (D) control signal component) determined by the analog computation portion. Then, a feedback control operation of passing a coil current through the coil according to the synthetic PID control signal is performed.

Incidentally, preferably, the proportional (P) control signal is also determined by the digital computation portion after the amount of displacement of the beam is digital-converted. If the amount of displacement of the beam is more than a threshold value, the weight value is obtained according to a total of a value represented by the proportional (P) control signal and a value represented by the integral (I) control signal, which is determined by the digital computation portion. If the amount of displacement of the beam is equal to or less than the threshold value, the weight value is obtained according to the value represented by the integral (I) control signal, which is determined by the digital computation portion.

Thus, if the amount of displacement of the beam is more than the threshold value, the proportional (P) control signal, which responds to the displacement of the beam more quickly than the integral (I) control signal, is added to the integral (I) control signal. Consequently, even in a transient state in which the beam largely moves, the weight value is indicated according to a signal obtained by adding the proportional (P) control signal thereto. Thus, the electronic balance can achieve the indication of the weight value with good followability, as compared with the case where the weight value is indicated according only to the integral (I) control signal.

DETAILED DESCRIPTION OF THE INVENTION

Hereinafter, embodiments for carrying out the invention are described by using the accompanying drawings. Incidentally, the embodiments described hereinbelow are only illustrative and may be modified without departing from the gist of the invention.

FIRST EMBODIMENT

Figure 1:
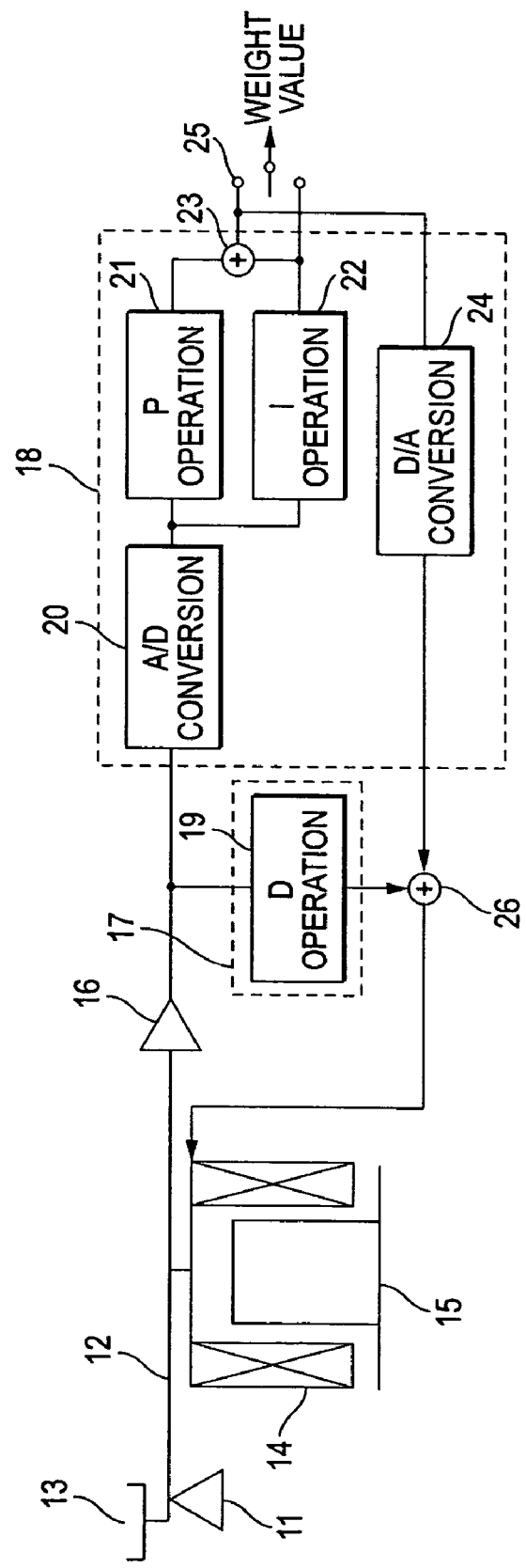
FIG. 1 is a configuration block diagram illustrating the general structure and the control system of an electronic balance that is an embodiment of the invention.

FIG. 1 is a configuration block diagram illustrating the general structure and the control system of an electronic balance that is an embodiment of the invention. A pan 13, on which a load having a weight W to be measured is loaded, is provided at one end of a beam 12 supported at a fulcrum 11 in such a way as to be able to turn therearound. A coil 14 is fixedly attached to a position on the beam 12, which is located opposite to the pan 13 across the fulcrum 11. The coil 14 is placed in a magnetic field generated by a permanent magnet 15 and adapted so that an electromagnetic force is generated due to the interaction of the coil 14 with the magnetic field of the permanent magnet 15 by passing electric current through the coil 14.

A position detection amplifier 16 for detecting displacement of the beam 12 is mounted in the vicinity of an end portion of the beam 12, which is opposite to the side to which the pan 13 is attached. This position detection amplifier 16 is adapted to detect an amount of displacement of the beam from a balanced point (or zero point) and to output an analog signal (hereunder referred to as a displacement amount analog signal).

The displacement amount analog signal outputted form the position detection amplifier 16 is sent to an analog computation portion 17 and a digital computation portion 18. The analog computation portion 17 is provided with a differential operation portion 19 for performing a differential operation on a displacement amount analog signal outputted from the position detection amplifier 16 and for outputting a differential control signal component as a differential (D) analog signal (hereunder referred to as a D analog signal). This differential operation portion 19 itself is constituted by a known differentiating circuit, and adapted so that the set value of a differential (D) constant can be adjusted by a semiconductor resistor (not shown) in the differentiating circuit.

The digital computation portion 18 is provided with an A/D converter 20, a proportional operation portion 21, an integral operation portion 22, a PI synthesis operation portion 23, and a D/A converter 24. The A/D converter 20 converts a displacement amount analog signal outputted from the position detection amplifier 16 into a digital signal (hereunder referred to as a displacement amount digital signal) corresponding to the amount of displacement of the beam. The proportional operation portion 21 performs a proportional operation on this displacement amount digital signal and outputs a proportional (P) control signal component as a proportional digital signal (hereunder referred to as a P digital signal). The integral operation portion 22 performs an integral operation on the displacement amount digital signal and outputs an integral (I) control signal component as an integration digital signal (hereunder referred to as an I digital signal). The PI synthesis operation portion 23 performs synthesis from or addition of the P digital signal outputted from the proportional operation portion 21 and the I digital signal outputted from the integral operation portion 22 and outputs a resultant digital signal (hereunder referred to as a synthetic PI digital signal). The D/A converter 24 analog-converts the synthetic PI digital signal outputted from the PI synthesis operation portion 23 into an analog signal (hereunder referred to as a synthetic PI analog signal).

Incidentally, each of the operation portions (the proportional operation portion 21, the integral operation portion 22, and the PI synthesis operation portion 23) provided between the A/D converter 20 and the D/A converter 24 is constituted by a microcomputer.

Also, the electronic balance is provided with a switch 25 for selectively taking out the synthetic PI digital signal, which is an output of the PI synthesis operation portion 23, and the I digital signal that is an output of the integral operation portion 22.

The output signal selected by the switch 25 is outputted as a signal representing load data. A weight value (a value obtained by converting the load data) is indicated by an indicator (not shown) according to the outputted load data. The switch 25 is adapted to be changed over by comparison between the amount of displacement of the beam (to be precise, an amount represented by a displacement amount digital signal that is obtained by an A/D conversion) and a preset threshold value.

Incidentally, practically, the switch 25 is constituted by a data selection switch that is implemented by software using a microcomputer.

A proportional constant (P) of the proportional operation portion 21 and an integral constant (I) of the integral operation portion 22 are set by using known digital input techniques. Practically, these constants can be set by performing a numerical input operation using a key, button, or switch (not shown).

A synthetic PI analog signal outputted from the D/A converter 24 and a D analog signal outputted from the differential operation portion 19 are sent to a power amplifier 26, whereupon a proportional (P) control signal component, an integral (I) control signal component, and a differential (D) control signal component are added up to thereby generate a synthetic PID control signal. Subsequently, the synthetic PID control signal is converted into a corresponding feedback coil current, which is then supplied to the coil 14.

Next, a feedback control operation of the electronic balance according to this embodiment is described hereinbelow.

When an object, whose weight is to be measured, is put on the pan 13, the beam 12 loses balance thereof and is displaced around the fulcrum serving as a movement center. An amount of displacement of the beam at that time is detected by the displacement detection amplifier 16, which then outputs a displacement amount analog signal whose magnitude corresponds to the amount of displacement of the beam.

The displacement amount analog signal outputted from the position detection amplifier 16 is sent to the differential operation portion 19 and also sent to the A/D converter 20 of the digital computation portion 18.

Subsequently, the differential operation portion 19 of the analog computation portion 17 outputs a differential control signal (a D analog signal), which represents an analog quantity, according to the displacement amount analog signal. The outputted differential control signal (the D analog signal) is sent to the power amplifier 26.

Meanwhile, in the digital computation portion 18, the displacement amount analog signal is digital-converted by the A/D converter 20 into a displacement amount digital signal, which is sent to the proportional operation portion 21 and the integral operation portion 22. The proportional operation portion 21 outputs a signal, which represents a proportional (P) control signal component, as a P digital signal. The integral operation portion 22 outputs a signal, which represents an integral (I) control signal component, as an I digital signal.

The outputted P digital signal and the outputted I digital signal are sent to the PI synthesis operation portion 23, and added up therein. Thus, a resultant signal is outputted as a synthetic PI digital signal.

Then, the synthetic PI digital signal outputted from the PI synthesis operation portion 23 is sent to the D/A converter 24 and analog-converted into a synthetic PI analog signal, which is sent to the power amplifier 26.

The power amplifier 26 adds the D analog signal outputted from the analog computation portion 17, and the synthetic PI analog signal outputted from the digital computation portion 18. Thus, a synthetic PID control signal synthesized from the proportional control signal, the integral control signal and the differential control signal is obtained. Subsequently, the power amplifier 26 outputs a feedback coil current corresponding to the synthetic PID control signal.

A quick response to a component of this synthetic PID control signal, which corresponds to the D analog signal, is made by utilizing analog feedback, while a response to a component of this synthetic PID control signal, which corresponds to the synthetic PI analog signal, is made by utilizing digital feedback through the A/D conversion, the digital computation, and the D/A conversion.

Then, the feedback coil current outputted from the power amplifier 26 is supplied to the coil 14. Thus, feedback control is provided so that an electromagnetic force due to the interaction of the coil 14 with the magnetic field of the permanent magnet 15 counterbalances the weight W of the load to be measured, which is applied to the pan.

Next, a weight measuring operation of the electronic balance according to this embodiment is described hereinbelow.

Figure 2:
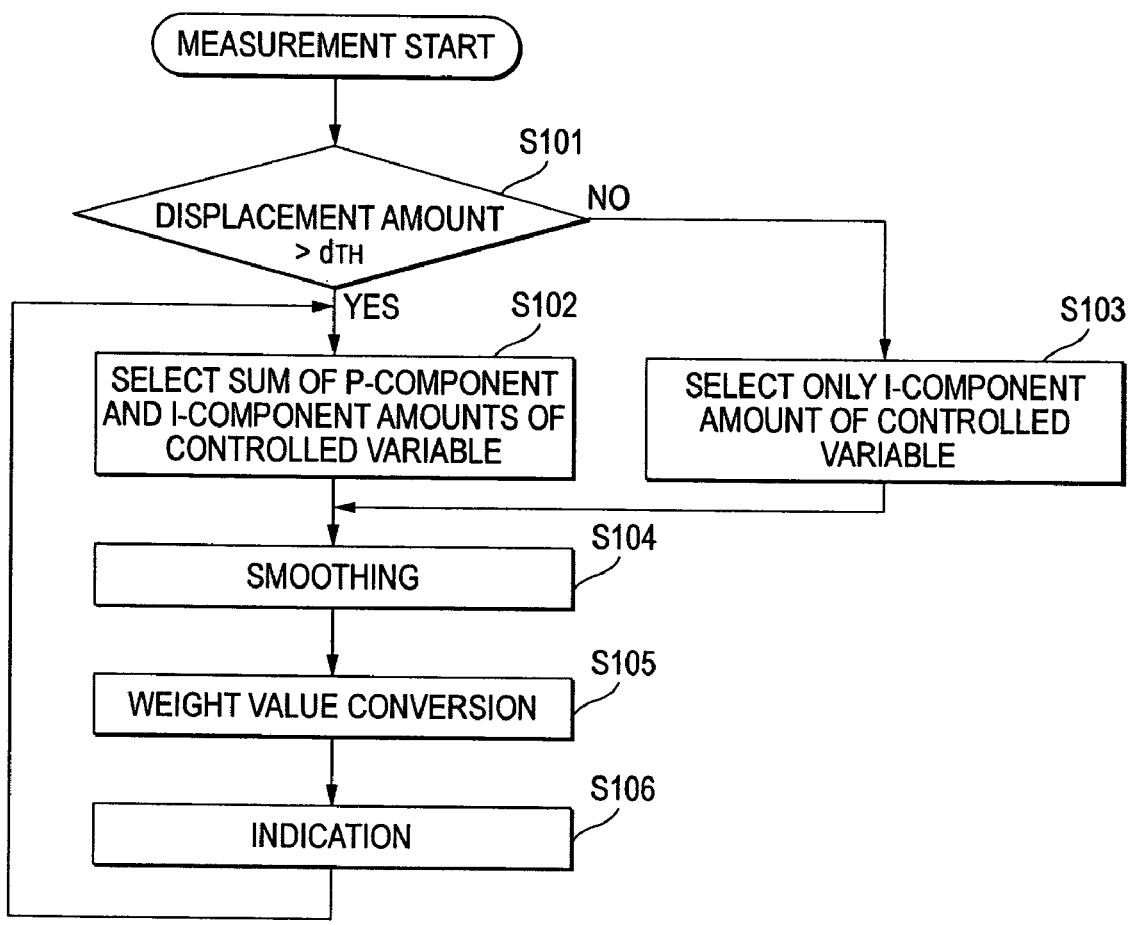
FIG. 2 is a flowchart illustrating a weight measuring operation of the electronic balance shown in FIG. 1.

As described above, one of the synthetic PI digital signal, which is an output of the PI synthesis operation portion 23, and the I digital signal, which is an output of the integral operation portion 22, is selected by the switch 25. A weight value is obtained according to the selected synthetic PI digital signal or the selected I digital signal. FIG. 2 shows a flowchart illustrating the operation up to the step of indicating the weight value.

When the load is applied onto the pan 13 and then the beam 12 is upwardly displaced, the position detection amplifier 16 detects an amount of displacement of the beam. Subsequently, the amount of displacement of the beam is compared with a preset threshold value ($d_{TH}$) (in step s101).

Then, if the amount of displacement is larger than the threshold value ($d_{TH}$), the switch 25 selects the synthetic PI digital signal outputted from the PI synthesis operation portion 23 (in step s102). If the amount of displacement is equal to or smaller than the threshold value ($d_{TH}$), the switch 25 selects the I digital signal outputted from the integral operation portion 22 (in step s103).

Subsequently, smoothing is performed (in step s104) by calculating a moving average of the synthetic digital signal or the I digital signal. Thus, occurrence of variation in the magnitude of the signal.

Then, the conversion of a weight value is performed according to smoothed digital signal data (in step s105) by using a conversion equation in which coefficients are determined by separately performing a calibrating operation using calibration weights.

The converted weight value is indicated in the digital indicator (in step s106).

Both the weight value, which is indicated at that time, and the coil feedback current are determined according to the digital signal (the synthetic PI digital signal or the I digital signal). Consequently, no quantization errors due to the digitization are caused between the feedback current and the indicated weight value.

SECOND EMBODIMENT

Figure 3:
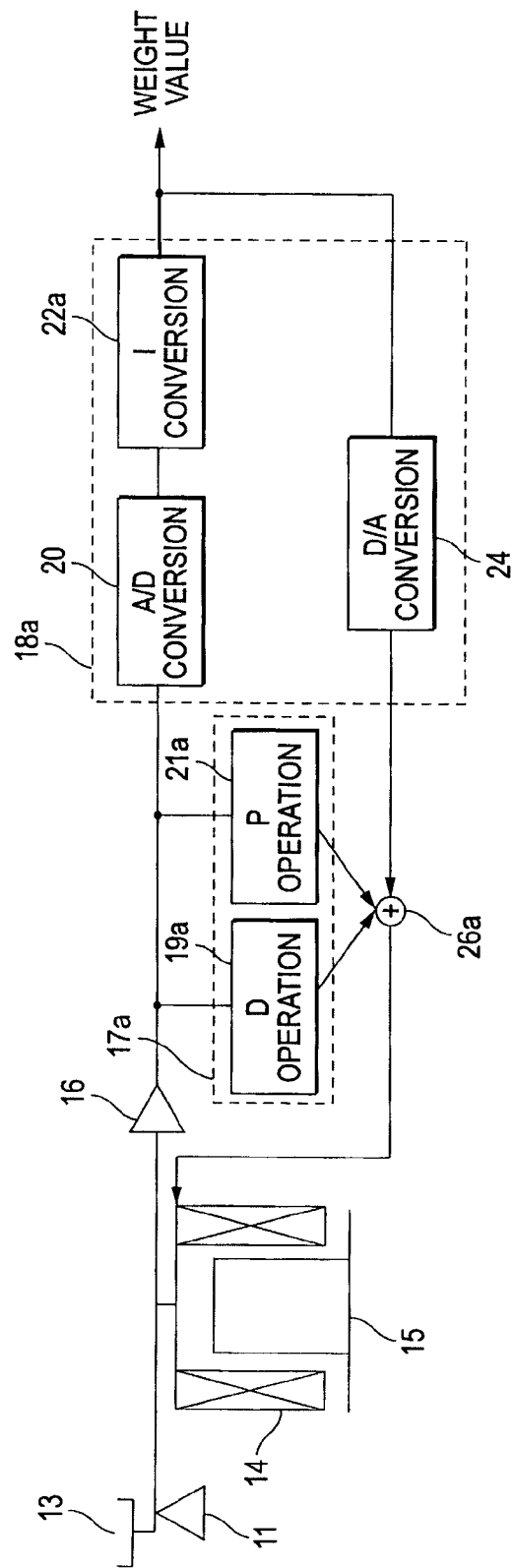
FIG. 3 is a configuration block diagram illustrating the general structure and the control system of an electronic balance that is another embodiment of the invention.

FIG. 3 is a configuration block diagram illustrating the general structure and the control system of an electronic balance that is another embodiment of the invention. Incidentally, each of constituents, which are the same as those shown in FIG. 1, is designated by the same character as that used for designating such a constituent. Thus, the description of such constituents is omitted herein.

In this second embodiment, an analog computation portion 17a is provided with a differential operation portion 19a and a proportional operation portion 21a. A digital computation portion 18a is provided with an integral computation portion 22a.

In the analog computation portion 17a, a differential operation and a proportional operation are performed on a displacement amount analog signal outputted from the position detection amplifier 14. A differential control signal component is outputted therefrom as a D analog signal. A proportional control signal component is outputted therefrom as a P analog signal. These analog signals are sent to a power amplifier 26a.

In the digital computation portion 18a, the displacement amount analog signal is digital-converted by the A/D converter 20 into a displacement amount digital signal, which is sent to the integral operation portion 22a. The integral operation portion 22a outputs an integral control signal components as an I digital signal.

The I digital signal is used for calculating a weight value, and sent to the D/A converter 24, which analog-converts the I digital signal and outputs a resultant signal as an I analog signal.

The I analog signal is sent to the power amplifier 26a, and added to the D analog signal outputted from the analog computation portion 18a, and the P analog signal. That is, a synthetic PID analog signal synthesized from the proportional control signal, the integral control signal, and the differential control signal is inputted to the power amplifier 26a, from which a feedback coil current corresponding to the synthetic PID analog signal is outputted.

A quick response to each of components of the synthetic PID analog signal, which respectively correspond to the D analog signal and the P analog signal, is made by utilizing analog feedback. A response to a component of the synthetic PID analog signal, which corresponds to the I analog signal, is made by utilizing digital feedback through the A/D conversion, the digital computation, and the D/A conversion.

Between the aforementioned two embodiments, the first embodiment is adapted so that the proportional (P) constant and the integral (I) constant can be set by directly inputting numerical values thereinto. However, in the case of the second embodiment, only the integral (I) constant can be set by directly inputting a numerical value thereinto. Thus, the first embodiment is advantageous in easiness of setting the constants and in flexibility in setting the constants. Although the second embodiment is slightly inferior to the first embodiment in such easiness of setting and such flexibility in setting the constants, analog feedback is used not only for the differential (D) component but also for the proportional (P) control component. Thus, the second embodiment improves responsivity still more, as compared with the first embodiment.

The invention can be applied to the case of manufacturing a high-resolution electronic balance, which excels in stability.

What is claimed is:

1. An electronic balance used by balancing an electromagnetic force and a weight comprising:
   a beam capable for being displaced according to the weight;
   a coil attached to the beam and placed in a magnetic field;
   a displacement detector for detecting an amount of displacement of the beam;
   an analog computation portion for determining at least a differential (D) control signal according to the amount of displacement of the beam;
   a digital computation portion for determining at least an integral (I) control signal after the amount of displacement of the beam is digital-converted; and
   a synthesizing portion for synthesizing from a resultant signal obtained by analog-converting the control signal component which is determined by said digital computation portion and the control signal component, which is determined by said analog computation portion in order to determine a synthetic PID control signal,
   wherein a coil current based on the synthetic PID control signal is passed through said coil to generate the electromagnetic force, and a weight value is obtained according to the control signal component determined by said digital computation portion, and
   wherein said digital computation portion also determines a proportional (P) control signal after the amount of displacement of said beam is digital-converted;
   if the amount of displacement of said beam is more than a threshold value, the weight value is obtained according to a total of a value represented by the proportional (P) control signal and a value represented by the integral (I) control signal, which is determined by said digital computation portion; and
   if the amount of displacement of said beam is equal to or less than the threshold value, the weight value is obtained according to the value represented by the integral (I) control signal, which is determined by said digital computation portion.

* * * * *

UNITED STATES PATENT AND TRADEMARK OFFICE
CERTIFICATE OF CORRECTION

PATENT NO. : 7,227,089 B2 Page 1 of 1
APPLICATION NO. : 11/034610
DATED : June 5, 2007
INVENTOR(S) : Shimauchi et al.

It is certified that error appears in the above-identified patent and that said Letters Patent is hereby corrected as shown below:

On the title page, Item [54], and Column 1, Title, delete "ELECTRIC BALANCE WITH SYNTHETIC PID CONTROL SIGNAL" and insert --ELECTRONIC BALANCE WITH SYNTHETIC PID CONTROL SIGNAL--.

Signed and Sealed this

Thirty-first Day of July, 2007

JON W. DUDAS
*Director of the United States Patent and Trademark Office*